United States Patent [19]

Gibson

[11] Patent Number: 4,843,840
[45] Date of Patent: Jul. 4, 1989

[54] RELATING TO FREEZING APPARATUS

[75] Inventor: Peter H. Gibson, Inkberrow, United Kingdom

[73] Assignee: BOC Limited, Windlesham, England

[21] Appl. No.: 112,608

[22] PCT Filed: Feb. 24, 1987

[86] PCT No.: PCT/GB87/00135
§ 371 Date: Nov. 2, 1987
§ 102(e) Date: Nov. 2, 1987

[87] PCT Pub. No.: WO87/04903
PCT Pub. Date: Aug. 27, 1987

[30] Foreign Application Priority Data

Feb. 25, 1986 [GB] United Kingdom ............... 8604643
Feb. 25, 1986 [GB] United Kingdom ............... 8604644

[51] Int. Cl.$^4$ ............................................. F75D 17/02
[52] U.S. Cl. ........................................ 62/375; 62/64; 62/380
[58] Field of Search .................... 62/64, 66, 375, 376, 62/380

[56] References Cited

U.S. PATENT DOCUMENTS

| 2,486,876 | 11/1949 | Protzeller | 62/380 X |
| 3,214,928 | 11/1965 | Oberdorfer | 62/64 X |
| 3,385,075 | 5/1968 | Casale | 62/64 X |
| 3,609,987 | 10/1971 | Walden | 62/64 X |
| 3,774,524 | 11/1973 | Howard | 62/64 X |
| 3,824,806 | 7/1974 | Wagner | 62/380 X |
| 3,855,815 | 12/1974 | Wagner | 62/380 X |
| 4,059,046 | 11/1977 | Yamazaki et al. | 62/380 X |
| 4,073,158 | 2/1978 | Guiller | 62/64 X |
| 4,655,047 | 4/1987 | Temple et al. | 62/64 |

FOREIGN PATENT DOCUMENTS

| 2306413 | 10/1976 | France. |
| 1376972 | 12/1974 | United Kingdom. |
| 2092880 | 8/1982 | United Kingdom. |
| 2117222 | 10/1983 | United Kingdom. |

Primary Examiner—William E. Tapolcai
Attorney, Agent, or Firm—Dennison, Meserole, Pollack & Scheiner

[57] ABSTRACT

Frozen solid particles are obtained from liquids such as dairy produce, liquid egg, microbiological cultures and pharmaceuticals, by direct contact with liquid nitrogen in an enclosed insulated vessel which includes nozzles for injection of liquids into conduits with contact channels additionally cooled by countercurrent flow of liquid nitrogen in cooling channels. A separation auger removes partially frozen product from the liquid nitrogen and completes its freezing by contact with cold nitrogen gas.

13 Claims, 7 Drawing Sheets

RELATING TO FREEZING APPARATUS

This invention relates to freezing apparatus and processes, in particular to the conversion into a solid particulate product of such materials as dairy produce (cream, milk, yoghurt), liquid egg, soups, pharmaceuticals, microbiological cultures, blood and blood components, proteins and plastics.

Various prior proposals have been made for methods of freezing dairy products into discrete particulate form. U.K. patent specification No. 1,264,439 describes direct contact of egg or dairy produce with a liquefied gas refrigerant to give pop-corn-like particles. U.K. patent specification 1,376,972 from the same patentees describes a small scale system (5 lb/hr per injection nozzle) for production of pellets of egg by causing the egg to fall from nozzles into liquefied gas refrigerant.

U.K. patent specification No. 2,092,880 discloses a method and apparatus for producing buoyant frozen pellets of liquid, preferably cream, by causing drops of liquid to fall onto or into a liquefied gas. U.K. patent specification No. 2,117,222 discloses a method and apparatus for producing discrete bodies of frozen liquid, e.g. cream, by passing a pulsating flow of the liquid into or onto a stream of liquefied gas. The present invention relates to an improved version of such systems in which the improvements provide for larger scale commercial operations and improved economics.

According to the invention there is provided apparatus for producing solidified particles from a liquid feedstock by direct contact with a refrigerant liquid, which apparatus comprises at least one channeled conduit to convey regrigerant liquid, supply means to convey a flow of liquid feedstock through one or more injection nozzles to the or each channeled conduit, separation means to recover solidified product from the refrigerant liquid and recirculation means for separated refrigerant liquid, wherein the or each channeled conduit comprises one or more contact channels in which the liquid feedstock flows together with refrigerant liquid and one or more cooling channels in which recirculated refrigerant liquid flows in heat exchange with at least one contact channel.

The choice of refrigerant liquid is mainly determined by the type and melting point of the material to be solidified, and it must usually be immiscible with this material. For milk and other dairy products, liquid egg, microbiological cultures and blood components, the liquid refrigerant is preferably liquid nitrogen.

I have discovered that a smooth, non-turbulent flow of refrigerant liquid along the feedstock/refrigerant contact channels is important in order to give uniformity in and control over both the size of product particle and the extent to which the particles are cooled. Several features associated with the channeled conduit enhance this uniformity and control. The first requirement is to minimise evaporation of refrigerant in the contact channels. This is achieved by the arrangement of contact channels and refrigerant channels which ensures that refrigerant channels act as a cooling jacket for the contact channels. It is desirable to keep the walls between the channels and any refrigerant liquid in the contact channels at a substantially constant temperature. If the refrigerant liquid is near its boiling point the temperature along the length of the conduit remains substantially constant because of heat withdrawn from the contact channels by the latent heat of evaporation of liquid in the cooling channels.

The configuration of channels within the channeled conduit is preferably such that recirculated refrigerant liquid flows in one direction along a cooling channel and then in a countercurrent direction along a contact channel.

In a preferred configuration of the apparatus the channeled conduits slope upwards toward the point at which liquid feedstock is introduced, such that feedstock and refrigerant liquid flow under gravity along the contact channel towards the separation means. In this configuration it is preferred to include an adjustable support at the upper end of the conduit so that the residence time of feedstock in refrigerant liquid can be selected by simply altering the angle of slope.

Viewed in cross-section each channeled conduit is preferably of one piece construction shaped in a single smoothly curved surface which forms the contact and cooling channels and the portions joining the channels to each other. The combination of one piece construction and smooth curves is beneficial in further encouraging uniform flow and in facilitating cleaning of the conduit. In its simplest form the required shape can be made from circular metal tubing by pushing a forming bar of smaller cross-section than the tube against the tube and parallel to the tube's axis so as to change part of the tube wall to a "collapsed" (i.e. concave) shape, thereby producing an open U-shaped contact channel with tubular portions at both ends. Having been so formed the conduit can be squeezed inwards to give a U-shaped configuration of lesser width, thereby both allowing more such conduits to be fitted into a given width in the apparatus and increasing the depth of the internal channel. The squeezing action also gives the tubular end portions of the conduit in oval shape.

Alternatively the conduit can be formed by two cylindrical channels disposed one within another, with the contact channel preferably being the inner channel so as to maximise the cooling effect of refrigerant liquid flowing in the outer channel. In cross-section the cylinders are preferably either circular or oval.

Construction of the channeled conduit from tubular material, with or without a concave section, makes for a strong, self supporting unit which resists distortion at the operational temperature and when cooling down to it.

The contact channel preferably has a sufficient straight length (typically 10 cm) upstream of the feedstock, inlet point to encourage the desired liquid flow qualities. This upstream part of the contact channel preferably has a vent for the escape of nitrogen gas. The vent can either be part of an end closure cap or the closure and vent may simply be a further extension of the upstream part, bent upwards to form a chimney, optionally with narrowed cross-section. The purpose of the vent is to ensure that the cooling material is maintained full of liquid so as to give maximum cold transfer to the contact channel.

As a further encouragement for laminar and uniform flow the upstream part of the contact channel preferably includes a vane structure. This can be formed from flat plates or a curved or cylindrical member. It preferably includes flaps bent to a shape to hold the vane firmly in place.

In its preferred form the apparatus includes a plurality of channeled conduits, each with one contact channel and one cooling channel, operating in parallel along-side each other and connected by common refrigerant feed manifolds at both ends. Alternatively a single conduit member can be provided with a corrugated upper surface to provide several open contact channels along most of its length, but with just one internal cooling channel for all the contact channels.

The selection of size and number of contact channels, and indeed the overall preferred size of the apparatus, is largely determined by the product requirements. If small particles (less than 4 mm diameter) are preferred, then the contact channels can be correspondingly narrow and a greater number can be fitted into a relatively small width within the apparatus. For larger particles (greater than 4 mm diameter) a choice must be made between small apparatus with a small number of wide channels and larger apparatus to accommodate more wide channels. The related components of the apparatus are sized to match the product type and volume leaving the contact channels.

In all versions of the apparatus there is preferably provided a header tank to supply refrigerant liquid to the channeled conduit.

The recirculation means for refrigerant liquid preferably includes a pump to lift into the header tank the refrigerant liquid separated from frozen product. The pump is preferably an auger incorporating an Archimedes screw and casing fixed together and located adjacent to the header tank. The helical surfaces of the screw need not extend across the full width of the casing but normally will do so. They may form a double or multiple helix for greater throughput and more even flow. In an even simpler version the pump for raising the liquid is simply one or more rotating helical tubes. Pumps with helical lift devices are well suited for use in the apparatus because of their low energy requirements and low speed of rotation. They have the advantage of not producing cavitation (i.e. vapour spaces) in the pumped liquid.

The separation means for removing solidified product from the refrigerant can be any type of filter which collects the solid while letting the refrigerant pass through. According to a preferred aspect of the invention the separation means is a further auger conveyor.

As described in U.K. patent specification No. 2 117 222 the extent of freezing a feedstock liquid in direct contact with a refrigerant liquid merely needs to be sufficient to freeze the periphery of the product particles, the further freezing of inner portions of the particles taking place after this direct contact. The apparatus of the present invention is designed to make maximum use of the cooling capacity of evaporated refrigerant gas by including a separation means which subjects the product particles to a flow path and residence time for thorough contact with the cold gas before ejecting them to a collecting point.

In its most preferred form the separation auger comprises several different sections disposed along a common axis, but formed in a single rotating unit. In sequence from the channeled conduit(s) the sections comprise first an open drum, ideally frusto-conical with its smaller diameter towards the channeled conduit(s), then a perforated cylindrical drum, containing one or more helices of wide pitch. This perforated section functions both as a separator sieve and as rapid conveyor of particulate product from the region of the channeled conduit(s). Lastly the separator auger includes a further cylindrical drum, not perforated, with one or more helices to convey the product more slowly than the first drum and discharge it through an outlet at the downstream (usually upper) end. These helices preferably do extend across the full internal width of the drum, from outer casing to central shaft, so as to present cold refrigerant gas with a long helical path through the drum in which to contact the product particles. They are also preferably fitted with internally directed ribs to help in tumbling the particulate solid and increasing the solid/gas contact. The ribs are located in abutment or attached to the inner side of the casing. They may be disposed longitudinally, parallel to the axis of the auger, but in a preferred configuration they present an angle significantly less than 90° to the flow of particles, thereby further enhancing the tumbling action. The angled ribs can conveniently be provided by flexible metal bars running from end to end of the helix and passing through notches in the outer edge of the helical surface.

The helix in the last section is preferably supported on central tube which can be perforated so as to allow injection of cleansing fluid via the tube when the refrigeration operation is complete.

A reservoir, usually simply a sump, is preferably provided beneath the separation means so as to collect the separated refrigerant liquid for recirculation. A filter is preferably located above the sump so as to retain any undersized product particles which leave the separation auger through the perforations for the refrigerant liquid.

A grading filter can also be provided at the solids outlet from the separation auger to remove any remaining undersized or oversized particles.

All parts of the apparatus in which refrigerant liquid is to be found, i.e. the channeled conduit(s), the refrigerant recirculation means and the product separation means, are preferably located within an insulated jacket. For use with a cryogenic refrigerant liquid such as liquid nitrogen the jacket is preferably of double skinned vacuum insulated construction. This has the added advantage that by virtue of its strength of construction the jacket can form the chassis for the apparatus, all other components being supported on or within it.

Thus in one aspect of the invention there is provided apparatus comprising an insulated jacket having a reservoir section for refrigerant liquid and two arms extending outwardly therefrom, one arm includinng, towards its outer end, inlet means for a liquid feedstock to be frozen and through at least part of its length one or more channeled conduits for refrigerant liquid and the other arm including separation means to remove solidified product from the refrigerant liquid and, towards its outer end, outlet means for the solidifed product. The arms preferably slope upwards from the reservoir section, the angle of slope of the inlet arm being typically ½ to 5° to the horizontal and the angle of slope of the outlet arm being typically 5° to 30° to the horizontal.

In the preferred configuration of the channeled conduit and separation means the two arms are disposed in the same vertical plane. The product particles leaving the channeled conduit thus pass to the separation means with no more than a slight change in direction in the horizontal plane. This arrangement, which is an important aspect of the "continuous flow" nature of the system, minimises damage to the newly frozen particles and helps to ensure a uniform product quality. It also permits a balanced (cantilever) construction with the two arms extending in opposing directions from the central (reservoir) section, which minimises the floor space required and enhances ease of access for cleaning and maintenance.

The jacket construction further permits a circulation of evaporated refrigerant gas around the components within the jacket, with the coldest, most dense, gas falling to the lowest part of the apparatus so as to provide a bath of cold gas which assists in minimising the liquid refrigerant requirements. The number of openings into the jacket is kept to a minimum, reducing the number of heat conducting paths between the interior and exterior. The evaporation of refrigerant liquid that does occur establishes a slight gas pressure inside the jacket and prevents ingress of air and any associated impurities.

One potential source of heat inleak into the apparatus is the outlet means necessarily provided at the base of the sump to assist emptying and cleaning. While a simple bung can be used it is preferred to include a relatively long emptying tube between the inner and outer skins of the vacuum jacket at the base of the sump and to provide a spring-loaded bung at the inlet end attached to a cable which passes through the tube and can be actuated from outside the jacket to lift the bung away from the inlet. The cable can if desired be enclosed within a plastic sleeve, thereby allowing it to carry an electrical signal from monitoring or control units inside the apparatus.

In normal operation the only outlet from the apparatus is the point of delivery of frozen product particles. It is important that ventilation means are included at this point to avoid the risk of evaporated refrigerant gas, which also leaves at the outlet, from entering the workplace atmosphere. A spring flap can be included on the outlet such that it only opens under a sufficient weight of product or internal gas pressure. The ventilation means normally include a gas extraction duct and gas extraction fans. The control system for the apparatus preferably includes fan speed regulators and also detection switches on any removable lids or other closures so that the control system responds to any removal of such closures by switching the fans to a high gas extraction speed.

Because the operating temperatures are below the feedstock temperature it is possible to take advantage of the different expansion coefficients of metal and plastics construction materials to ensure that components are firmly held together at operating temperature but easily dismantled at feedstock temperature.

Several of the components of the apparatus are preferably formed by such a combination of metal portion (usually stainless steel) and plastics portion (usually polyethylene). The plastics material shrinks on cooling to give a firm joint with the metal. The components include the channeled conduit(s), the auger conveyor(s), the refrigerant feed manifolds and the mountings for them. For the channeled conduit, all the external flow connections and any attachment of one such conduit to another are best formed in this way. The refrigerant feed manifolds are similarly secured to the individual conduits and to the refrigerant feed tube(s). For the auger conveyors the helix can be of metal held within an outer band of plastics material which shrinks on to the helix. In one convenient form a casing of thin metal sheet is wrapped around the helix and held in place by plastic rings or bands. These bands can either be solid across their width or provided with a longitudinal slot which stops short of the ends and allows the band to be held at both ends by a single fixed peg attached to the casing.

Shrink-fit assemblies are an important feature of the invention and make for simple and economical construction. Along with several other features they also assist cleaning and maintenance.

Ease of cleaning is especially important if the apparatus is to be used for food or medical products, so as to ensure the highest standards of hygiene. In this respect a useful feature of the apparatus is its avoidance of welded joints, which can otherwise form crevices which are difficult to clean.

Differential expansion of the metal components of the apparatus which might cause distortion of the apparatus, can be avoided by including a bellows section in such parts as the outer arms.

Bearings throughout the apparatus are preferably constructed to avoid metal to metal contact, by means of a plastic or ceramic bearing block for metal components or vice versa.

The feedstock should preferably be in a homogeneous, freeflowing liquid condition for injection into the apparatus. Some preliminary mixing and/or heating may be necessary to ensure this condition.

Although the feedstock flowstream tends to break up into discrete liquid particles as it contacts the liquid refrigerant, the break-up is preferably assisted by including a pulsing system, for example a peristaltic pump. Regular pulsing assists in giving a uniform particle size. A particular advantage of the invention is that it permits a high rate of injection of pulsed feedstock from each injection nozzle into the contact channel. Typical pulsation rates are in the range 5 to 30 pulses per second, giving a rate of injection at least 10 times higher than in systems in which the feed liquid falls from a nozzle under gravity. Examples of suitable pulsing systems include (a) a peristaltic pump with rotating rollers bearing upon a flexible supply line, (b) a peristaltic pump with rollers oversized so as to give a longer pulse, (c) a peristaltic pump with rollers plus a pulsed gas supply, (d) a gear pump with pulsed gas supply and (e) a flexible line repeatedly squeezed by other mechanical, solenoid or pneumatic action.

Preferably each channeled conduit has a single supply line leading to it, and to no other conduit, for the supply of feedstock liquid and each supply line has an individual feed system.

The supply lines for liquid feedstock are preferably retractable from the inlet by means of a sliding attachment to a guide outside the inlet arm. Each supply line preferably has a shielding gas jacket or heated insulation to reduce direct contact with evaporated refrigerant inside the apparatus and thereby minimise the risk of freezing before the feedstock reaches the channeled conduit. The injection nozzles are preferably aligned to introduce feedstock in substantially the same direction as the flow of refrigerant liquid.

The services for the power-driven parts of the apparatus are preferably carried on a tubular frame superstructure. Motors should be included within a suitable housing, usually together with the process controls and gauges. Drive shafts from the motors can be carried on the tubular frame. All the motors preferably have variable speed drive. This makes for great flexibility in the respective flow rates of refrigerant or feedstock and product particles, and thus offers a wide range of product particle size, rate of production and extent of freezing.

Gas-purged inspection ports are preferably provided near the feedstock inlet and the central section so as to allow progress of the freezing operation to be directly monitored.

All lids and closure caps should have suitable resilient seals (for example silicone rubber sealing rings) to prevent escape of refrigerant gas.

Typical dimensions of the preferred apparatus according to the invention are 2 meters each for the channeled conduits and the separation auger, a diameter of 75 cm for the central section, and internal diameters 30 cm for the inlet and outlet arms. The auger pump is inclined at about 35° to the horizontal and the auger separator at about 20°. All parts, are made as light as possible consistent with adequate mechanical strength. The stainless steel outer skin of the insulating jacket is 3 mm thick, the inner skin 1.5 mm, the headed tank and the helices of the augers 1.25 mm and the casings of the augers 0.7 mm.

In using such a unit for cream freezing the liquid nitrogen flow rate is typically 8 liters/minute through each contact channel, and the cream injection rate about ½ liter/minute.

In a five channel apparatus the auger pump accordingly produces a recirculation rate of 40 liters per minute and the separator delivers about 150 kg/hr frozen cream.

The uniform size of product particles obtainable according to the apparatus and in processes using it is of considerable market appeal, making it possible for a user to select consistently sized measures or doses of the product.

Reference is made by way of example to the accompanying drawings, in which

Figure 1:
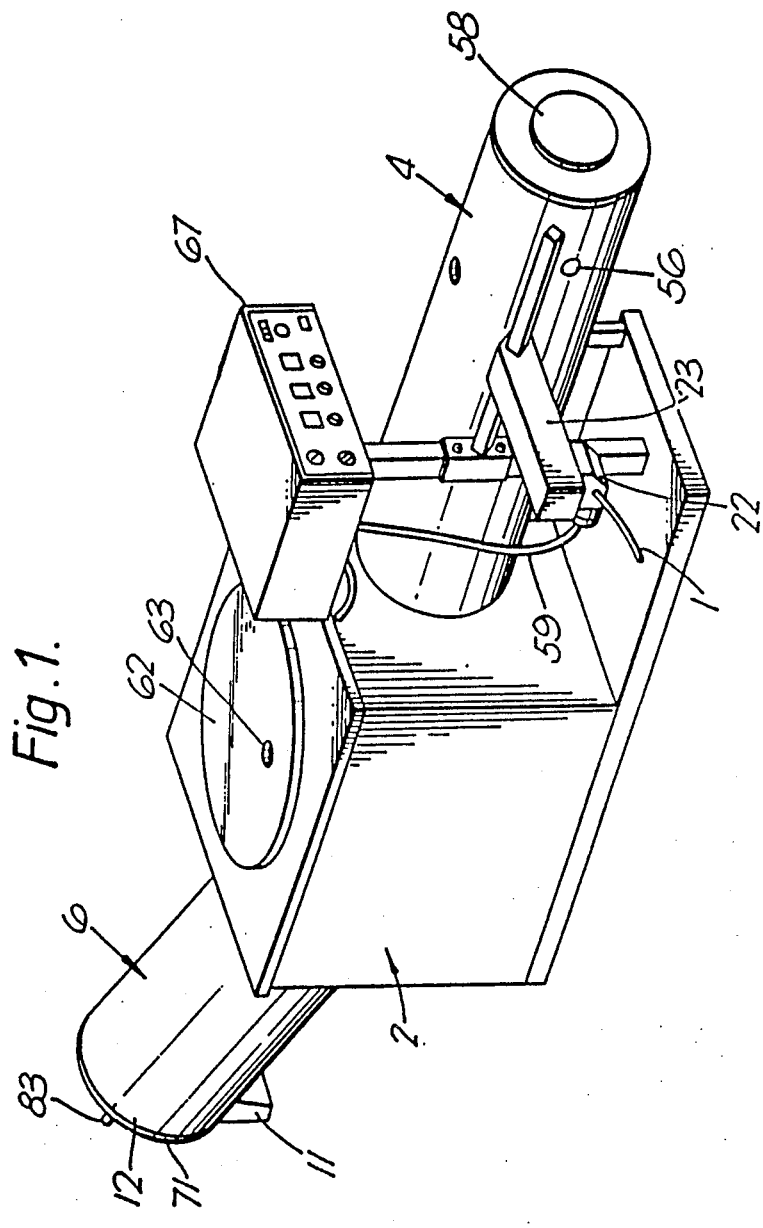
FIG. 1 is a schematic perspective view of one version of freezing apparatus according to the invention.

The apparatus has a central zone 2, an inlet arm 4 of circular cross-section and an outlet arm 6 of circular cross-section, all of which are enclosed within a vacuum jacket 8 with inner and outer skins 10 and 12 respectively. In the inlet arm 4 there are five channeled conduits 14 inclined at a low angle to the horizontal, leading through the inlet arm 4 into the central zone 2.

Each conduit 14 has a concave (U-shaped) channel 20 extending along part of its length, an enclosed cooling channel 32 and flow connecting means 34 joining the channels 20 and 32 at its upper end.

An inlet opening 1 for liquid to be frozen leads to a peristaltic pump 22 which feeds inlet tubes 16 and associated nozzles 18 to inject a pulsed stream of liquid into each of the channels 20. The inlet tubes 16 are each disposed within a shielding sleeve 17. They are mounted together with the peristaltic pump 22 and inlet opening 1 on a bracket 23a which is slidable on a fixed guide post 23b attached to a support arm 23c. The guide post 23b has an adjustable stop 15 which can be moved to and secured at any chosen vertical position on the guide post 23b.

Figure 2:
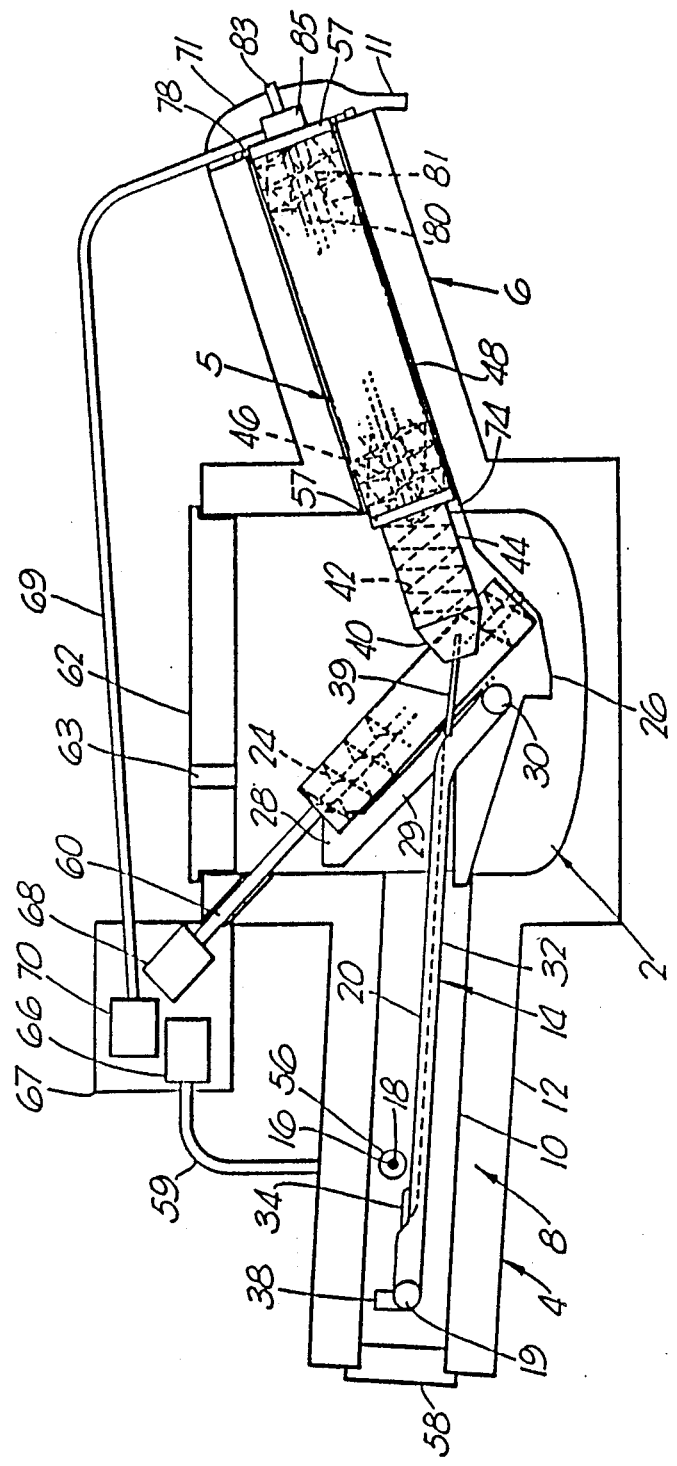
FIG. 2 is a schematic vertical cross-section from end to end of the apparatus shown in FIG. 1.
Figure 3:
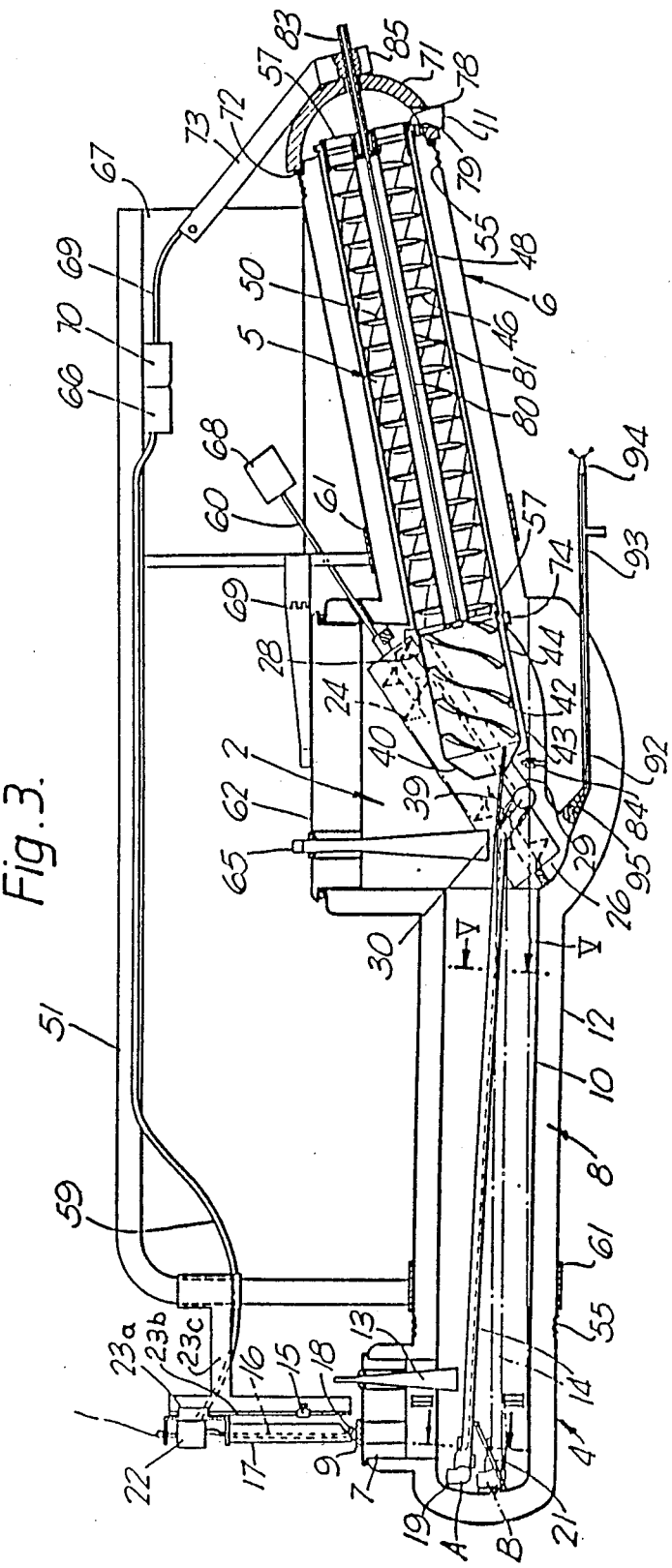
FIG. 3 is a more detailed vertical cross-section of a production version of the apparatus.

The inlet tubes 16, shields 17 and nozzles 18 are inserted into the arm 4 through a slot in a sealed insulated closure 7 (not FIGS. 1 and 2 - see below). The slot has a cap 9 to prevent escape of refrigerant when the inlet assembly tubes, shields and nozzles 16, 17, 18 are not in place in the arm 4. The lid 7 also houses an inspection tube 13 to allow progress of the liquid injection to be monitored. The inlet assembly tubes, shields and nozzles 16, 17, 18 are shown in FIG. 3 in preoperational position outside the arm 4. (FIGS. 1 and 2 show a side-mounted version of the inlet assembly, with just an end closure 58 in the arm 4 and a side inlet 56 for the feed tubes 16).

The conduits 14 extend the whole length of the arm 4 and into the central zone 2. They are pivoted at their lower end and rest at their upper end on a sprung lever 21 (FIG. 3).

The lever 21 holds the conduits 14 in position A prior to operation, giving a relatively steep angle to the conduits 14 and a fast flow of refrigerant liquid which helps in sweeping away any residual feedstock from previous operations. When the inlet tubes, shields and nozzles 16, 17, 18 are moved into their operating position, the lower ends of the shields 17 push the conduits 14 downwards against the spring lever 21 until the slidable bracket 23a meets the stop 15, thereby locating the conduits 14 in position B. The operating angle of the conduits 14 is thus determined by the chosen position of the stop 15.

The upper and lower ends of each of the conduits 14 are not formed into a concave shape but are left with a circular cross-section. At the point near the upper end where the circular cross-section changes to a channeled cross-section there is provided a circular port 33. The flow connecting means 34 is a shaped vane with flexible retaining flaps 41 and extends through the circular port 33 along the same axis as the conduit 14, upwards into the upper part of the conduit 14 and downwards to the external channel 20. The uppermost end of the conduit 14 has a closure manifold 19 fitted with a nitrogen gas vent 38.

Figure 7:
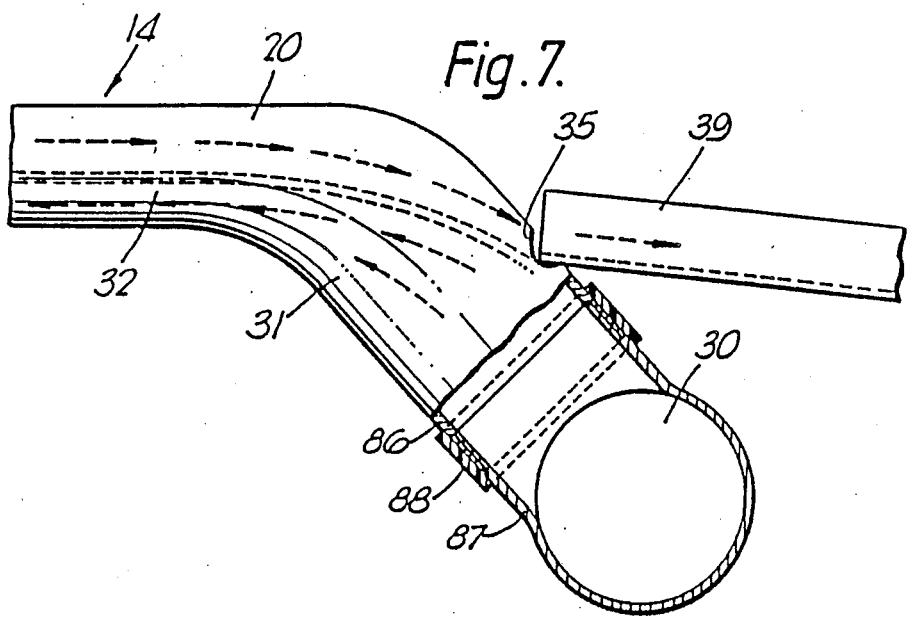
FIG. 7 is an enlarged view, partly in section, of the lower end of channeled conduit shown in FIGS. 2 and 3.

The lower portions of the conduits 14 lead into the central section 2. Near the lower end of each conduit 14, at the point where the concave shaped changes back to a circular cross-section, the conduit 14 bends downwards to form a circular lower portion 31 (FIG. 7). Just below the outside of the bend the outer surface has a notch 35 to receive an inclined flat trough 39 which slopes at a slightly larger angle than the operational angle of the conduit 14. The trough 39 extends at its upper end across the full width of all five conduits 14 and is held firmly against all five notches 35 by metal springs (not shown). It narrows towards its lower end so as to lead into a conical inlet portion 40 of a product removal auger 5 which leads from the central section 2 through the outlet arm 6. The lowermost ends of the conduits 14 are joined to a single manifold 30 which is in turn connected via a refrigerant feed tube 29 to a header tank 28 located at the same vertical height as the upper part of the conduits 14.

Figure 6:
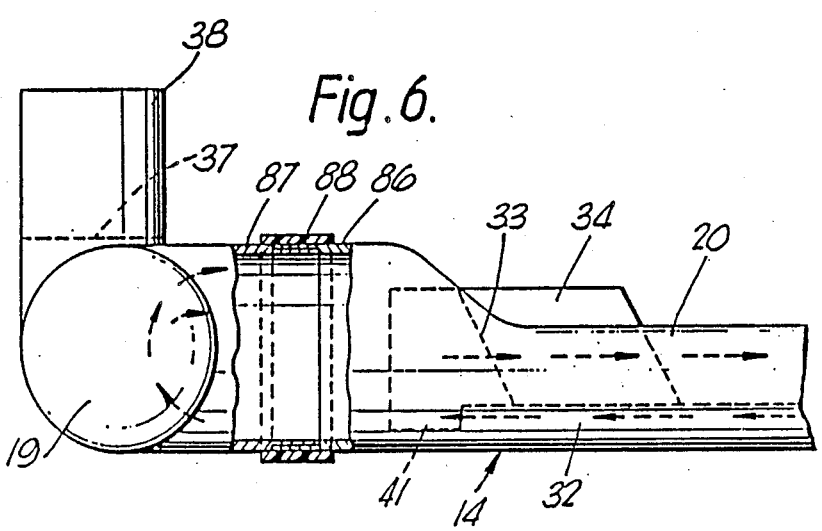
FIG. 6 is an enlarged view, partly in section, of the upper end of channeled conduit shown in FIGS. 2 and 3.

The manifolds 19 and 30 are connected to the ends of conduits 14 by shrink fit assemblies (shown in cross-section in FIGS. 6 and 7). The tubular ends 86 of conduit 14 are shaped to receive mating tubular projections 87 from the manifolds. The joint so formed is enclosed within a polyethylene ring 88 which at operational temperatures shrinks to form a tight seal.

A refrigerant lifting auger 24, in the form of a rotating casing with an internal helical screw, is disposed between the sump 26 and the header tank 28.

The product auger 5, which rotates as a single unit, comprises the inlet cone 40, a first helical screw 42 (in the form of a double helix) in a first cylindrical portion 44 and a second helical screw 46 (in the form of a single helix) in a second cylindrical portion 48. The first screw 42 is of shorter length than the second but its double surfaces and wider pitch are arranged to give faster throughput of solid material. The cylinder 44 has slots to permit liquid nitrogen to drain into a sump 26. A filter tray 43 is disposed beneath the cone 40 and cylinder 44 and slopes towards a collector 45 at a lower level in central zone 2.

The helical screw 46 is built on a perforated central tube 81. A tie rod 80, coaxial with tube 81, holds together end hubs 57 of the helical screw 46.

The upper end hub 57 of cylinder 48 is attached to a plastic thrust ring 78 which forms a tight shrink fit on the hub 57 at operating temperatures. The inner surface of the ring 78 forms both a bearing and a gas thrust seal against the end of the insulating jacket 8. The outer edge of ring 78 rests on two metal bearing blocks 79 so as to locate the upper end of the auger 5 centrally in the circular cross-section of the arm 6. The lower end of the auger 5 similarly rests on two plastic bearings blocks 74 where cylinder 48 meets the lower hub 57. The arm 6 has an outer end cap 71, with a silicone ring seal 72, mounted on a pivoted arm 73 (FIG. 3). The end cap 71 incorporates a product outlet 11 and a hollow central tube 83. This tube 83 functions as the drive shaft from a gearbox 85 to the auger hub 57 and also, by removal of an end stopper (not shown), as an inlet for cleansing fluid to pass through the perforated tube 81 to clean the auger 5 after the freezing operation.

The sump 26 is provided with a drain tube 92 with a springloaded bung 95 actuated by a plastic-coated flexible cable 93. Rotation of a screw attachment 94 opens or closes the bung 95 against its spring action.

Figure 8:
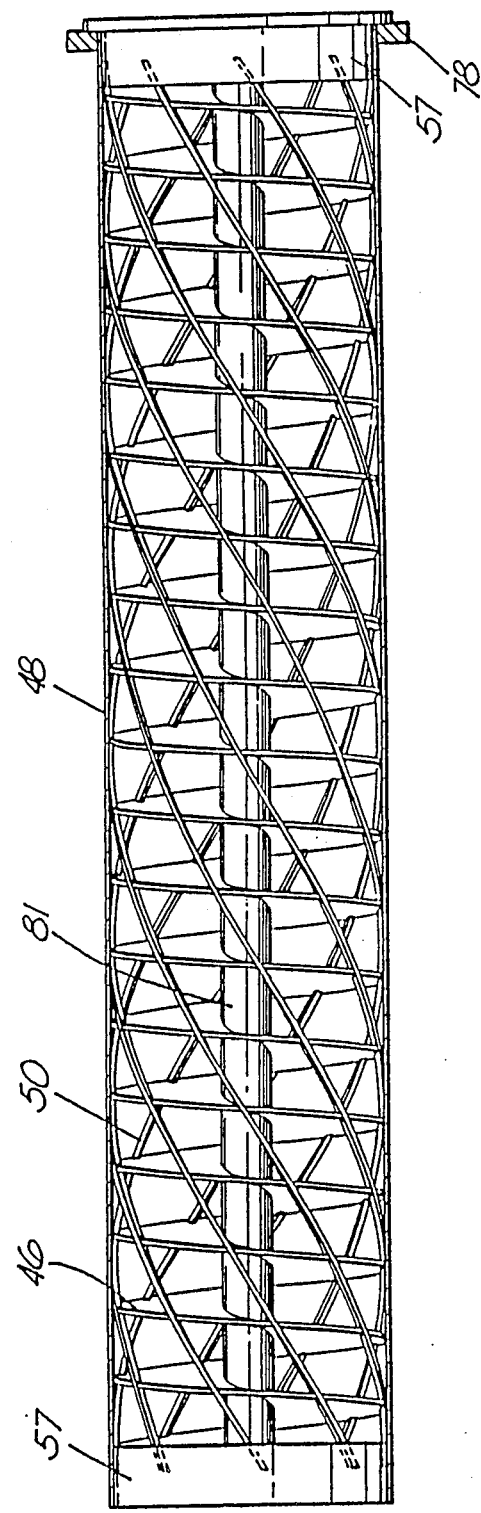
FIG. 8 is an enlarged elevation of a product removal conveyor in the FIG. 1–7 apparatus.

The cylinder 48 is provided with curved outer ribs 50 (FIG. 8) to enhance the tumbling action by spreading out the product particles.

The central zone 2 has an insulated lid 62 with an inspection tube 63 to monitor the progress of the freezing. The lid 62 is attached to a slidable, pivoted retaining arm 69 (FIG. 3).

The insulating jacket on both the arms 4 and 6 is provided with flexible bellows 55 (FIGS. 3 and 4) to allow for metal expansion and contraction. Band clamps 61 are also provided on both arms 4 and 6 and hold a tubular frame 51 which carries the components of the apparatus external to the insulated jacket 8. These components include the support arm 23c for the inlet assembly, the pivoted arm 73 for the end cap 71, a motor 66 and a drive shaft 59 for the peristaltic pump 22, a motor 68 and its drive shaft 60 for the lift auger 24 and a motor 70 and its drive shaft 69 to the gearbox 85 for separation auger 5. The motors 66, 68 and 70 and the process controls are housed in a control box 67.

Figure 9:
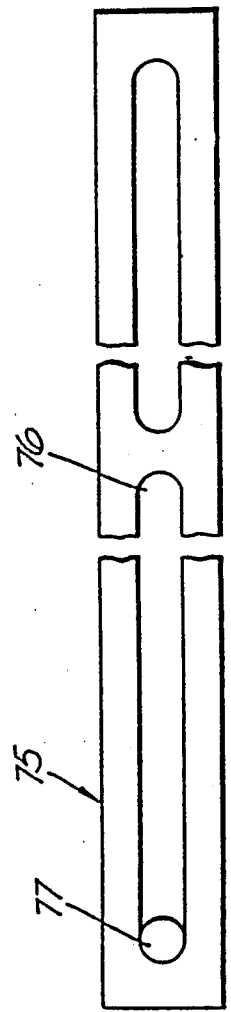
FIG. 9 is an elevation of a retaining band used in the FIGS. 1 to 8 apparatus.

FIG. 9 shows the configuration of plastic band used to hold together the casing of the auger conveyors 5 and 24. The band is a length 75 of flexible polyethylene with elongated slots 76 cut along its axis. The band is cut to the size required for the particular component. One end of the band is hooked over a metal spigot 77 on the outer surface of the casing, the band is run around the circumference of the casing and the other end is then hooked over the same spigot. The band is sized such that a ambient temperature it can be easily hooked over the spigot but as it contracts to liquid nitrogen temperatures it shrinks and fixes the casing firmly around the helix.

Figure 10:
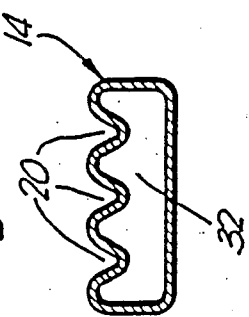
FIG. 10 is a vertical cross-section through an alternative version of channeled conduit, taken along a line equivalent to V—V of FIG. 3.

In the alternative version of channeled conduit 14 shown in section in FIG. 10, three external channels 20 are formed in the upper side of the conduit, with a single internal channel 32. This construction allows a greater number of contact channels in a given width in the apparatus.

Figure 4:
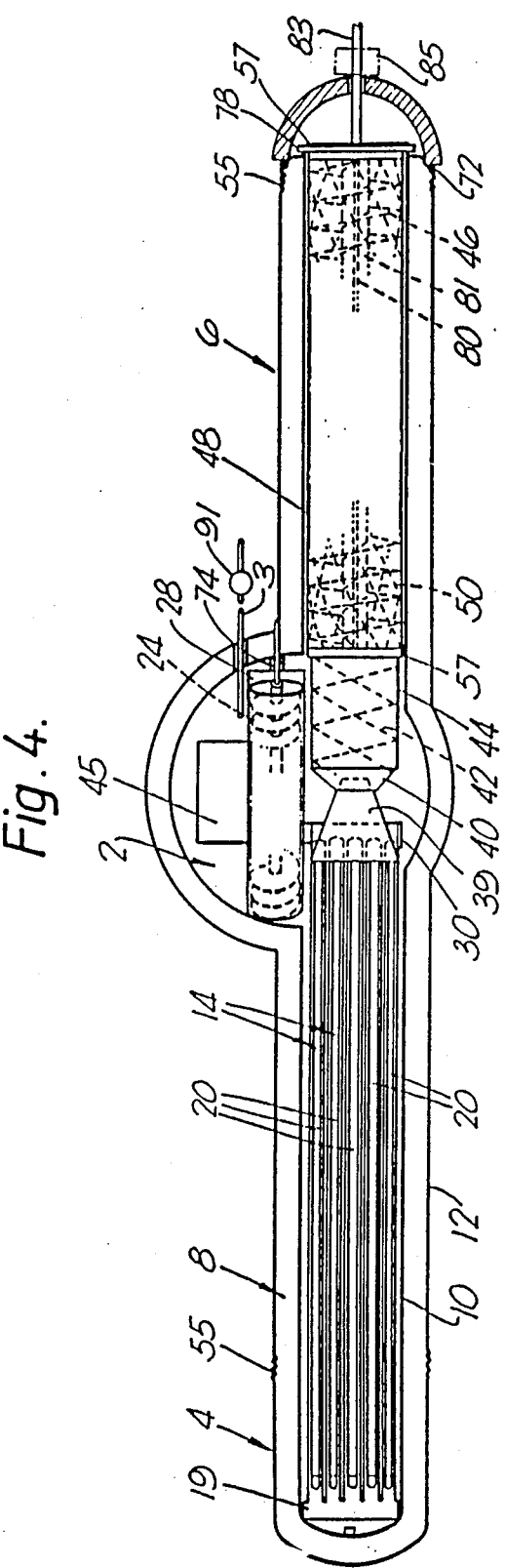
FIG. 4 is a plan view, partly in section, of the production version of apparatus shown in FIG. 3.
Figure 5:
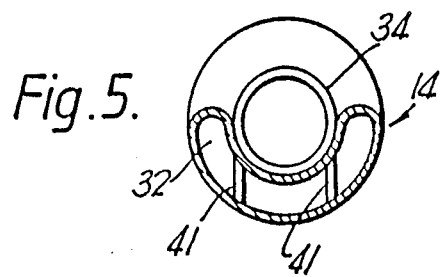
FIG. 5 is an enlarged cross-section of flow interconnecting means in the FIG. 1–4 apparatus, taken along the line III—III of FIG. 3.

For the supply of refrigerant liquid to all versions of the apparatus, the central zone 2 comprises a supply line 3 and a control valve 91 (FIG. 4).

In operation with liquid nitrogen in the apparatus shown in FIGS. 1 to 9, the auger conveyor 24 raises liquid nitrogen from the sump 26 to adjacent header tank 28 from which liquid nitrogen flows downwards through the feed tube 29 and then via the manifold 30 to the internal channels 32 of conduits 14. The head pressure in the tank 28 causes liquid nitrogen to flow up the channels 32 to the manifold 19 to a level as indicated by the line 37 (FIG. 6), giving an even supply of liquid nitrogen to the channels 20. It will be noted that in the version of apparatus shown in FIG. 2, the auger conveyor 24 and the feed tube 29 slope towards the inlet arm 4, whereas in the version shown in FIG. 3, they slope away from it. The circuit through which the liquid nitrogen circulates is the same in both versions, i.e. from the sump 26, through the auger conveyor 24, header tank 28, feed tube 29, manifold 30, and up the channels 32 to the manifold 19 and into the channels 20.

The inlet assembly is moved into operational position once the liquid nitrogen has cooled the apparatus to working temperature. Feedstock (e.g. cream) to be frozen is pumped through the nozzles 18 and breaks into droplets which freeze around their periphery as they travel down the channels 20 with the liquid nitrogen. The droplets and liquid nitrogen then pass over the trough 39 into the auger 5, from which the liquid nitrogen drains into the sump 26 from which it is raised by the auger conveyor 24 for recirculation through the circuit described above. Any undersized product particles carried out with the liquid nitrogen are caught by the tray 43 and settle in collector 45. The screw 42 rapidly conveys the frozen droplets to the screw 46 in which they are more slowly tumbled in cold nitrogen exhaust gas by the rotation of the auger 5, enhanced by the tumbler bars 50.

The temperature in the auger 5 tends to rise from inlet to outlet as the further freezing proceeds: the product temperature at the auger 5 inlet is typically −110° C. rising to −50° C. at the outlet.

The frozen droplets leaving the end of the screw 46 fall under gravity through the outlet 11 to a suitable container. The outlet 11 is connected to gas exhaust ducting (not shown) fitted with variable speed extraction fans.

The auger screw 24 constantly recirculates liquid nitrogen to the header tank 28 and any additional requirement for liquid nitrogen is detected by level gauge 84 which actuates control valve 91 in the liquid nitrogen supply line 3. One of the advantages of the apparatus is its high efficiency in utilisation of liquid nitrogen, such that additional nitrogen requirements are kept to a minimum. This efficiency derives from the smooth and direct liquid nitrogen/feedstock contact in the channels 20, the low heat inleak because of the insulated jacket 8 and its minimal number of openings, the cold nitrogen gas/droplet contact in the separation auger 5, and the lower mass of all metal parts which minimises the nitrogen demands on start-up.

After use the apparatus is easy to clean and service. Warm cleaning fluid is first poured in, whereupon all the metal/plastic shrink-fit joints loosen. The cleansing fluid is circulated by the liquid nitrogen circulation system (24, 28, 14, 40, 42 etc.) and achieves a good measure of cleansing without any further dismantling of the apparatus. Spent cleansing fluid is removed through the sump drain 92.

If further dismantling is required, all internal components are sized so that they can be readily withdrawn through an adjacent opening in the insulated jacket 8. The plastic to metal bearing construction chosen because of its advantages of firm fit at low temperatures also gives the advantage of easy withdrawal of components without the use of spanners or special tools.

I claim:

1. Apparatus for producing solidified particles from a liquid feedstock by direct contact with a refrigerant liquid, which apparatus comprises at least one channeled conduit to convey refrigerant liquid, supply means to convey a flow of liquid feedstock through one or more injection nozzles to one or more channels in the channeled conduit, separation means to remove solidified particles from the refrigerant liquid and recirculation means for separated refrigerant liquid, wherein the channeled conduit comprises one or more contact channels in which the liquid feedstock flows together with the refrigerant liquid and one or more cooling channels in which recirculated refrigerant liquid flows in heat exchange with at least one contact channel.

2. Apparatus as claimed in claim 1, wherein the channeled conduit slopes upwards to the point at which liquid feedstock is introduced, has a refrigerant liquid inlet at the lower end of the cooling channel and has interconnecting means between the cooling and contact channels at their upper end to convey refrigerant liquid from the cooling channel to the contact channel.

3. Apparatus as claimed in claim 1 wherein the channeled conduit is of one-piece construction around its cross-section.

4. Apparatus as claimed in claim 1 wherein the channels in the conduit are U-shaped, with a greater depth than width.

5. Apparatus as claimed in claim 1 wherein the angle of slope of the channeled conduit is adjustable.

6. Apparatus as claimed in claim 1 wherein a flow guide is provided near the upstream end of the contact channel to encourage laminar flow of refrigerant liquid along the channel.

7. Apparatus as claimed in claim 1 wherein the channeled conduit has an end closure incorporating a gas vent.

8. Apparatus as claimed in claim 1 including a helical auger pump to lift refrigerant liquid separated from the particulate product into a header tank connected to the channeled conduit.

9. Apparatus as claimed in claim 1 wherein the separation means is an auger including a perforated drum and a non-perforated drum directly abutting each other and rotating as one unit on a common axis.

10. Apparatus as claimed in claim 1 wherein the separation means is an auger incorporating one or more screw helices and internally directed ribs to help in tumbling the product as it passes through.

11. Apparatus as claimed in claim 10, wherein the ribs are curved bars presenting an angle significantly less than 90° to the flow of product particles.

12. Apparatus as claimed in claim 1 comprising an insulated jacket having a reservoir section for refrigerant liquid and two arms sliding upwardly herefrom, one arm including, toward its upper end, inlet means for the liquid feedstock and, through at least part of its length, the channeled conduit and the other arm including the separation means.

13. Apparatus as claimed in claim 10 wherein one or more of the channeled conduits, the auger conveyors and the feed manifolds are formed by a shrink-fitting combination of metal inner portion and plastics outer portion.

* * * * *